(12) United States Patent  
Takai

(10) Patent No.: US 6,782,485 B2
(45) Date of Patent: Aug. 24, 2004

(54) MICROCOMPUTER OPERABLE WITH EXTERNAL AND INTERNAL CLOCK SIGNALS

(75) Inventor: Hiroyuki Takai, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 672 days.

(21) Appl. No.: 09/826,347

(22) Filed: Apr. 5, 2001

(65) Prior Publication Data

US 2001/0029589 A1 Oct. 11, 2001

(30) Foreign Application Priority Data

Apr. 6, 2000 (JP) ........................................ 2000-104577

(51) Int. Cl.[7] .............................................. G06F 1/04
(52) U.S. Cl. ......................... 713/500; 327/18; 327/20; 331/49; 331/59
(58) Field of Search ................................ 713/400, 500; 327/18, 20; 331/49, 59

(56) References Cited

U.S. PATENT DOCUMENTS 5,369,377 A * 11/1994 Benhamida ................... 331/49
5,424,661 A * 6/1995 Lin et al. ....................... 327/18
5,467,028 A * 11/1995 Yoshida et al. ............... 326/38
6,237,090 B1 * 5/2001 Alavoine ....................... 713/1

FOREIGN PATENT DOCUMENTS

JP 64-31258 2/1989
JP 11-7333 1/1999

* cited by examiner

Primary Examiner—Thomas Lee
Assistant Examiner—Tse Chen
(74) Attorney, Agent, or Firm—Foley & Lardner LLP

(57) ABSTRACT

A microcomputer is provided, which eliminates the need of input of a selection signal to select whether an external oscillator element is connected to generate an internal clock signal or an external clock signal is inputted to generate an internal clock signal. In this microcomputer, a delay circuit generates a delayed reset signal from an external reset signal to have a specific delay period. An external clock signal detection circuit detects an external clock signal at a second terminal, outputting a detection signal. An oscillation control signal generation circuit generates an oscillation control signal for an amplifier circuit, where the oscillation control signal is generated corresponding to a detection signal outputted from an external clock signal detection circuit. The oscillation control signal is used to activate the amplifier when the external clock signal does not exist at the second terminal and to inactivate the amplifier when the external clock signal exists at the second terminal. These operations are conducted in the specific delay period of the delayed reset signal.

12 Claims, 10 Drawing Sheets

MICROCOMPUTER OPERABLE WITH EXTERNAL AND INTERNAL CLOCK SIGNALS

BACKGROUND OF THE INVENTION

1. Field of the Invention

The present invention relates to a microcomputer and more particularly, to a microcomputer operable to be synchronized with an internal clock signal generated in the microcomputer itself when an external oscillator element is connected and with an external clock signal provided from the outside of the microcomputer.

2. Description of the Related Art

Conventionally, microcomputers of this type, which have been extensively used as control computers for controlling various instruments, are provided with oscillation circuits for generating an internal clock signal. An example of the oscillation circuits of the conventional microcomputers of this type is shown in FIG. 1, which is disclosed in the Japanese Non-Examined Patent Publication No. 11-7333 published in January 1999.

The conventional oscillation circuit shown in FIG. 1 comprises three external terminals X1, X2, and IN, an inverting amplifier circuit 111, an inverted 107, and a buffer amplifier 108.

The terminal X1 is used for connection of an external oscillation element (not shown) such as a quartz or crystal oscillator provided outside. The terminal X2 is used for connection of an external oscillator element (not shown) such as a quartz or crystal oscillator provided outside or for receiving an external clock signal. The terminal IN is used for receiving an external selection signal for selecting whether an external oscillator element is connected across the terminals X1 and X2 or an external clock signal is directly supplied to the terminal X2.

The inverting amplifier circuit 111 comprises two p-channel Metal-Oxide-Semiconductor Field-Effect Transistors (MOSFETs) 101 and 102 connected in series, two n-channel MOSFETs 103 and 104 connected in series, an n-channel MOSFET 105, and an inverter 106. The source of the MOSFET 102 is connected to the power supply line supplied with a supply voltage $V_{DD}$ by way of the MOSFET 101. The drain of the MOSFET 102 is connected to the drain of the MOSFET 103. The source of the MOSFET 103 is connected to the ground by way of the MOSFET 104. The gazes of the MOSFETs 102 and 103 are coupled together to form the input terminal of the circuit 111, which is connected to the terminal X1. The drain of the MOSFETs 102 and 103 are coupled together to form the output terminal of the circuit 111, which is connected to the terminal X2 and the input terminal of the buffer amplifier 108.

The gate of the MOSFET 101 is connected to the output terminal of the inverter 106. The gaze of the MOSFET 104 is connected to the gate of the MOSFET 105 and the input terminal of the inverter 106. The source and drain of the MOSFET 105 are respectively connected to the terminals X1 and X2.

The input terminal of the inverter 107 is connected to the terminal IN. The output terminal of the inverter 107 is connected to the gates of the MOSFETs 104 and 105 and the input terminal of the inverter 106

The output terminal or the buffer amplifier 108 emits an internal clock signal φ for inner circuits (not shown) of the conventional microcomputer.

With the conventional oscillator circuit shown in FIG. 1, when the selection signal applied to the terminal IN is in the logic-low (L) level, both the MOSFETs 101 and 104 are turned on and at the same time, the MOSFET 105 is turned on. Thus, the inverting amplifier circuit 111 is activated, thereby conducting its self-biasing and inverting-amplification operations. On the other hand, when the selection signal applied to the terminal IN is in the logic-high (H) level, both the MOSFETs 101 and 104 are turned off and at the same time, the MOSFET 105 is turned off. Thus, the circuit 111 is inactivated and kept in the high impedance (Hi-Z) state.

When an external oscillator element is connected across the terminals X1 and X2, the selection signal in the L level is applied to the terminal IN to activate the inverting amplifier circuit 111. Thus, the terminal X1 is self-biased and the signal fed back through the oscillator element is inverting-amplified. This means that the external oscillator element and the amplifier circuit 111 constitute an "oscillation circuit" for generating the internal clock signal φ. The internal clock signal φ thus generated is outputted by way of the buffer amplifier 108 and then, it is supplied to the internal circuit of the microcomputer for its normal operation.

Also, an external reset signal (not shown) is applied to the internal circuit. In this case, the internal circuit is initialized and then, it starts the specific operations according to the signal φ.

On the other hand, when no external oscillator element is connected across the terminals X1 and X2, the selection signal in the H level is applied to the terminal IN, inactivating the inverting amplifier circuit 111. Thus, the circuit 111 is brought to the Hi-Z state, where an external clock signal can be applied to the terminal X2. In this case, an external clock signal applied to the terminal X2 is sent to the internal circuit of the microcomputer as the internal clock signal φ by way of the buffer amplifier 108.

The internal circuit is initialized by an external reset signal (not shown) and then, it starts the specific operations according to the signal φ.

As explained above, with the conventional oscillator circuit of the conventional microcomputer shown in FIG. 1, the selection signal needs to be applied to the terminal IN in order to select whether an external oscillator element is connected across the terminals X1 and X2 or an external clock signal is directly applied to the terminal X2. As a result, one of the external terminals of the conventional microcomputer has to be assigned to the input of the selection signal in spite of the count (i.e., the total number) of the external terminals being limited. This fact causes a problem that the count of the external terminals applicable to signal input or output (i.e., the count of the programmable input/output terminals for a user) is decreased.

SUMMARY OF THE INVENTION

Accordingly, an object of the present invention is to provide a microcomputer that eliminates the need of input of a selection signal to select whether an external oscillator element is connected to generate an internal clock signal or an external clock signal is inputted to generate an internal clock signal.

Another object of the present invention is to provide a microcomputer that increases the count of programmable or usable input/output terminals for a user.

Still another object of the present invention is to provide a microcomputer that ensures its stable operation.

The above objects together with others not specifically mentioned will become clear to those skilled in the art from the following description.

According to a first aspect of the present invention, a microcomputer is provided. This microcomputer comprises:

(a) a first terminal and a second terminal which are connectable to an external oscillation element;

the second terminal being able to receive an external clock signal when the external oscillation element is not connected;

(b) a third terminal for receiving an external reset signal;

(c) an amplifier circuit for constituting an oscillation circuit along with an external oscillation element when the external oscillation element is connected across the first terminal and the second terminal;

the oscillation circuit being used for generating an oscillation signal;

(d) an internal clock signal output circuit for outputting an internal clock signal corresponding to the oscillation signal generated by the oscillation circuit or the external clock signal;

the internal clock signal being used for operating an internal circuit of the microcomputer;

(e) an internal reset signal generation circuit for generating an internal reset signal corresponding to the external reset signal;

the internal reset signal being used for resetting the inner circuit for initialization;

(f) a delay circuit for generating a delayed reset signal brow the external reset signal;

the delayed reset signal having a specific delay period with respect to the external reset signal;

(g) an external clock signal detection circuit for detecting the external clock signal at the second terminal;

the external clock signal detection circuit outputting a detection signal; and (h) an oscillation control signal generation circuit for generating an oscillation control signal for the amplifier circuit;

the oscillation control signal being generated corresponding to the detection signal outputted from the external clock signal detection circuit;

the oscillation control signal being used to activate the amplifier when the external clock signal does not exist at the second terminal and to inactivate the amplifier when the external clock signal exists at the second terminal.

With the microcomputer according to the first aspect of the invention, the delay circuit generates the delayed reset signal from the external reset signal to have the specific delay period. The external clock signal detection circuit detects the external clock signal at the second terminal, outputting a detection signal. The oscillation control signal generation circuit generates the oscillation control signal for the amplifier circuit, where the oscillation control signal is generated corresponding to the detection signal outputted from the external clock signal detection circuit. The oscillation control signal is used to activate the amplifier when the external clock signal does not exist at the second terminal and to inactivate the amplifier when the external clock signal exists at the second terminal. These operations are conducted in the specific delay period of the delayed reset signal.

Accordingly, when the external clock signal does not exist at the second terminal (i.e., the internal clock signal is generated from the oscillation circuit), the external clock signal detection circuit detects this fact, activating the amplifier by way of the oscillation control signal. In this case, the internal clock signal output circuit outputs the internal clock signal corresponding to the oscillation signal generated by the oscillation circuit.

On the other hand, when the external clock signal exists at the second terminal (i.e., the internal clock signal is generated from the external clock signal), the external clock signal detection circuit detects this fact, inactivating the amplifier by way of the oscillation control signal. In this case, the internal clock signal output circuit outputs the internal clock signal corresponding to the external clock signal.

As explained above, with the microcomputer according to the first aspect of the invention, whether the external oscillator element is connected across the first and second terminals or the second terminal receives the external clock signal to generate the internal clock signal is detected automatically. This means that the need of input of a selection signal is eliminated for this purpose.

Also, when the second terminal receives the external clock signal to generate the internal clock signal, the amplifier is inactivated. Thus, the first terminal can be used as an input/output terminal. In other words, the count of programmable or usable input/output terminals for a user is increased by one.

Moreover, if the internal reset signal generation circuit generates the internal reset signal corresponding to the external reset signal using the delayed reset signal, the oscillation signal generated by the oscillation circuit can be stabilized in the delay period of the delayed reset signal. Thus, the stable operation of the microcomputer is ensured.

In a preferred embodiment of the microcomputer according to the first aspect, an input port control circuit is additionally provided. The input port control circuit controls supply or block of the signal at the first terminal to the internal circuit according to an input port control signal. The input port control signal is generated in the oscillation control signal generation circuit.

In another preferred embodiment of the microcomputer according to the first aspect, the oscillation control signal generation circuit includes an AND gate and an OR gate. The AND gate receives the delayed reset signal and the detection signal, outputting the oscillation control signal. The OR gate receives the inverted, delayed reset signal and the detection signal, outputting the input port control signal.

In still another preferred embodiment of the microcomputer according to the first aspect, the internal reset signal generation circuit outputs the internal reset signal in a period until the oscillation signal generated by the oscillation circuit is stabilized.

In a further preferred embodiment of the microcomputer according to the first aspect, the internal reset signal generation circuit outputs the internal reset signal to the internal circuit in a specific period after the internal circuit is reset by the internal reset signal.

In a still further preferred embodiment of the microcomputer according to the first aspect, a pull-down or pull-up circuit is additionally provided to lower or raise a level of the second terminal according to the delayed reset signal.

According to a second aspect of the present invention, another microcomputer is provided. This microcomputer comprises:

(a) a first terminal and a second terminal which are connectable to an external oscillation element;

the second terminal being able to receive an external clock signal when the external oscillation element is not connected;

(b) a third terminal for receiving an external reset signal;

(c) an amplifier circuit for constituting an oscillation circuit along with an external oscillation element when the external oscillation element is connected across the first terminal and the second terminal;

the oscillation circuit being used or generating an oscillation signal;

(d) an internal clock signal output circuit for outputting an internal clock signal corresponding to the oscillation signal generated by the oscillation circuit or the external clock signal;

the internal clock signal being used for operating an internal circuit of the microcomputer;

(e) an internal reset signal generation circuit for generating an internal reset signal corresponding to the external reset signal;

the internal reset signal being used for resetting the inner circuit for initialization;

(f) a latch circuit for latching a signal at the first terminal and for outputting a detection signal according to the signal thus latched; and (g) an oscillation control signal generation circuit for generating an oscillation control signal for the amplifier circuit;

the oscillation control signal being generated corresponding to the detection signal outputted from the latch circuit;

the oscillation control signal being used to activate the amplifier when the external clock signal does not exist at the second terminal and to inactivate the amplifier when the external clock signal exists at the second terminal.

With the microcomputer according to the second aspect of the invention, the latch circuit latches the signal at the first terminal and outputs the detection signal according to the signal thus latched. The oscillation control signal generation circuit generates the oscillation control signal for the amplifier circuit corresponding to the detection signal outputted from the latch circuit. The oscillation control signal is used to activate the amplifier when the external clock signal does not exist at the second terminal and to inactivate the amplifier when the external clock signal exists at the second terminal.

Accordingly, when some signal exists at the first terminal (i.e., the internal clock signal is generated from the oscillation circuit) the latch circuit latches the signal at the first terminal, activating the amplifier by way of the oscillation control signal. In this case, the internal clock signal output circuit outputs the internal clock signal corresponding to the oscillation signal generated by the oscillation circuit.

On the other hand, when no signal exists at the first terminal (i.e., the internal clock signal is generated from the external clock signal), the latch circuit latches no signal, inactivating the amplifier by way of the oscillation control signal. In this case, the internal clock signal output circuit outputs the internal clock signal corresponding to the external clock signal.

As explained above, with the microcomputer according to the second aspect of the invention, whether the external oscillator element is connected across the first and second terminals or the second terminal receives the external clock signal to generate the internal clock signal is detected automatically. This means that the need of input of a selection signal is eliminated for this purpose.

Also, when the second terminal receives the external clock signal to generate the internal clock signal, the amplifier is inactivated. Thus, the first terminal can be used as an input/output terminal. In other words, the count of programmable or usable input/output terminals for a user is increased by one.

Moreover, if the internal reset signal generation circuit generates the internal reset signal corresponding to the external reset signal after a specific delay period, the oscillation signal generated by the oscillation circuit can be stabilized in the delay period. Thus, the stable operation of the microcomputer is ensured.

In a preferred embodiment of the microcomputer according to the second aspect, an input port control circuit is additionally provided. The input port control circuit controls supply or block of the signal at the first terminal to the internal circuit according to an input port control signal. The input port control signal is generated in the oscillation control signal generation circuit.

In another preferred embodiment of the microcomputer according to the second aspect, the oscillation control signal generation circuit includes an AND gate and an OR gate. The AND gate receives the external reset signal and the detection signal, outputting the oscillation control signal. The OR gate receives the external reset signal and the detection signal, outputting the input port control signal.

In still another preferred embodiment of the microcomputer according to the second aspect, the internal reset signal generation circuit outputs the internal reset signal in a period until the oscillation signal generated by the oscillation circuit is stabilized.

In a further preferred embodiment of the microcomputer according to the second aspect, the internal reset signal generation circuit outputs the internal reset signal to the internal circuit in a specific period aster the internal circuit is reset by the internal reset signal.

In a still further preferred embodiment of the microcomputer according to the second aspect, a pull-down or pull-up circuit is additionally provided to lower or raise a level of the first terminal according to the external reset signal.

BRIEF DESCRIPTION OF THE DRAWINGS

In order that the present invention may be readily carried into effects, it will now be described with reference to the accompanying drawings.

DETAILED DESCRIPTION OF THE PREFERRED EMBODIMENTS

Figure 1:
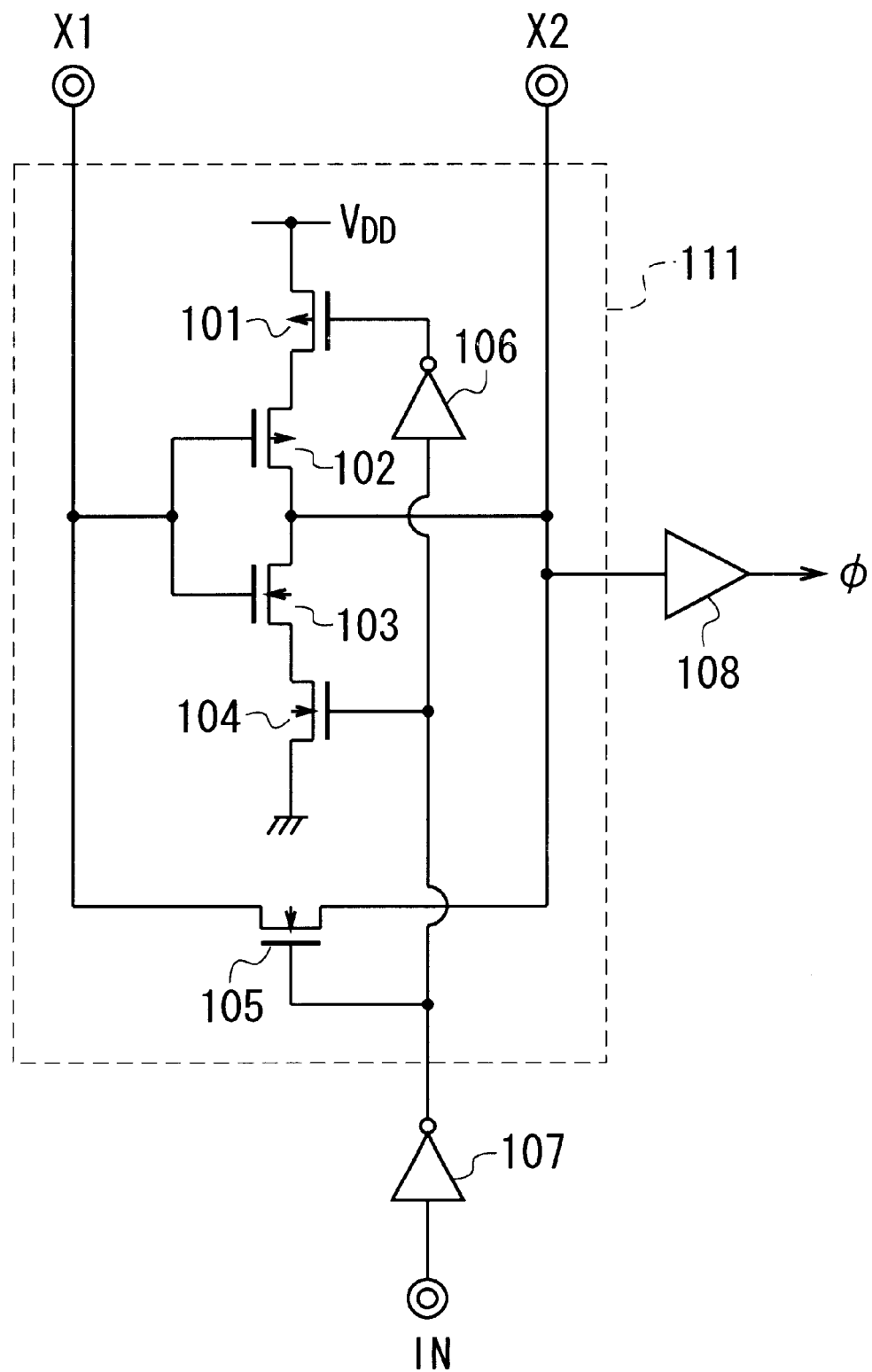
FIG. 1 is a schematic circuit diagram showing the configuration of an oscillator circuit of a conventional microcomputer.

Preferred embodiments of the present invention will be described in detail below while referring to the drawings attached.

First Embodiment

Figure 2:
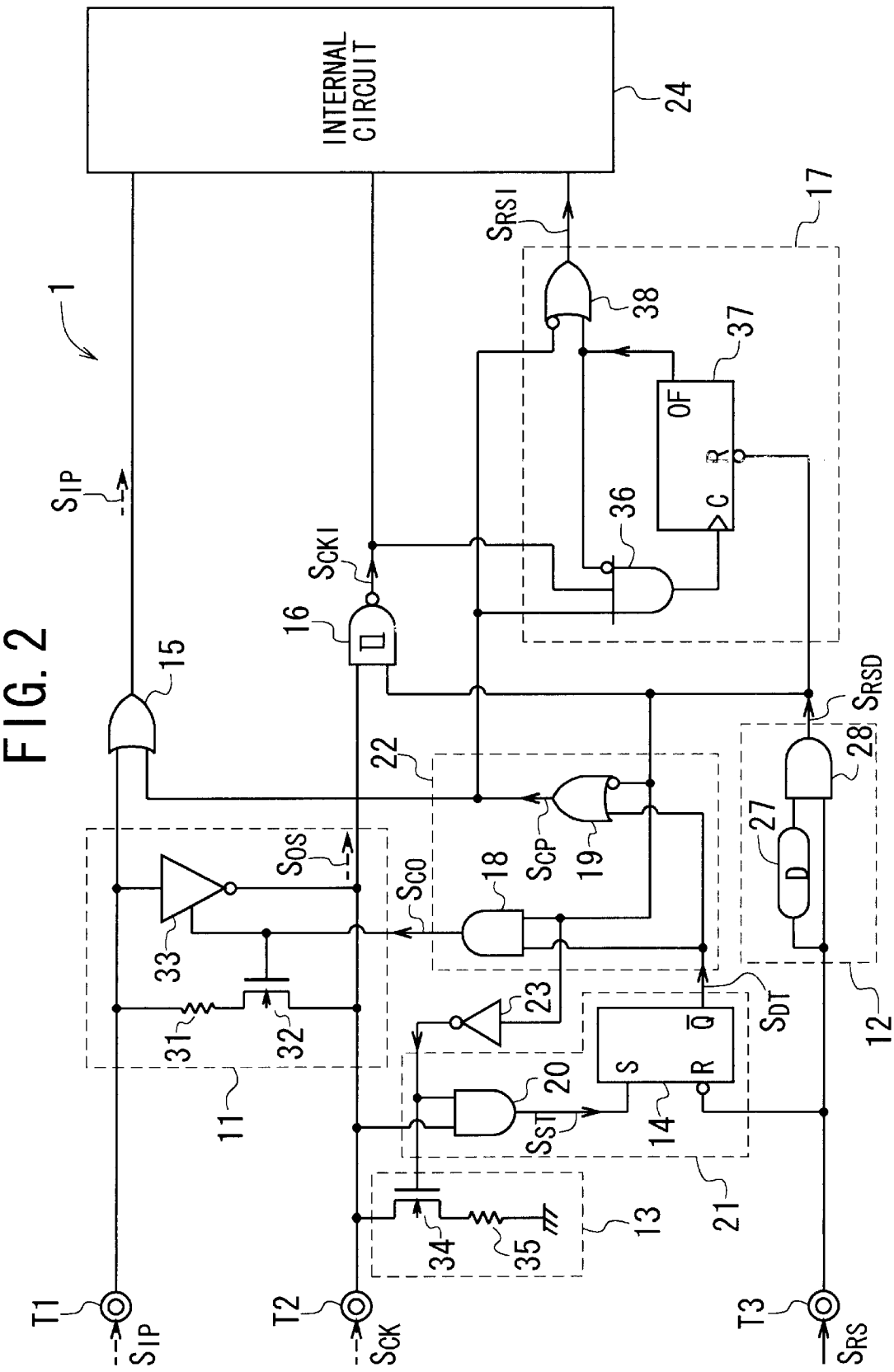
FIG. 2 is a schematic circuit diagram showing the configuration of the main part of a microcomputer according to a first embodiment of the invention.

As shown in FIG. 2, a microcomputer 1 according to a first embodiment of the invention comprises three external terminals T1, T2, and T3, an inverting amplifier circuit 11, a reset signal delay circuit 12, a pull-down circuit 13, an external clock signal detection circuit 21, an input port control circuit 15, a clock signal output circuit 16, an internal reset signal generation circuit 17, a control signal generation circuit 22, an inverter circuit 23, and an internal circuit 24. It is needless to say that the microcomputer 1 comprises actually other external terminals for connection to external circuits or input of external signals. However, only three external terminals T1, T2, and T3 relating to the invention are illustrated in FIG. 2.

The terminal T1 is used to connect an external oscillator element Q or to receive an input port signal $S_{IP}$ (i.e., as an input port of the input port signal $S_{IP}$). The terminal T2 is used to connect the external oscillator element Q or to receive an external clock signal $S_{CK}$ (i.e., as an input port of the external clock signal $S_{CK}$). The terminal T3 is used to receive an external reset signal $S_{RS}$ (i.e., as an input port of the external reset signal $S_{RS}$).

The reset signal delay circuit 12 includes a delay element 27 and a two-input AND gate 28. One of the two input terminals of the gate 28 is directly connected to the terminal T3 while the other input terminal thereof is connected to the terminal T3 by way of the delay element 27. The circuit 12 delays the external reset signal $S_{RS}$ supplied through the terminal T3 and outputs a delayed reset signal $S_{RSD}$ having a delayed leading edge by a specific delay time with respect to the external reset signal $S_{RS}$.

The pull down circuit 13 includes an n-channel MOSFET 34 and a resistor 35. The drain of the MOSFET 34 is connected to the terminal T2 while the source of the MOSFET 34 is connected to the ground by way of the resistor 35. The gate of the MOSFET 34 receives the delayed reset signal $S_{RSD}$ outputted from the reset signal delay circuit 12 by way of the inverter 23. In other words, the gate of the MOSFET 34 receives an inverted one of the delayed reset signal $S_{RSD}$. The circuit 13 conducts the pull-down operation according to the inverted, delayed reset signal $S_{RSD}$, in other words, it pulls down the potential at the terminal T2 with the resistor 35 during the period where the delayed reset signal $S_{RSD}$ is in the L level.

The external clock detection circuit 21 includes an AND gate 20 and a flip-flop 14. One input terminal of the AND gate 20 is connected to the terminal T2 while the other input terminal thereof is connected to the output terminal of the inverter 23. The AND gate 20 generates the logical product of the inverted, delayed reset signal $S_{RSD}$ supplied from the inverter 23 and the signal at the terminal T2, outputting it as the set signal $S_{ST}$ for the flip-flop 14.

The set and reset terminals of the flip-flop 14 are connected to the output terminal of the AND gate 20 and the terminal T3, respectively. The flip-flop 14 is reset by an inverted ore of the external reset signal $S_{RS}$ supplied through the terminal T3 and it is set by the set signal $S_{ST}$ supplied through the AND gate 20.

Figure 4:
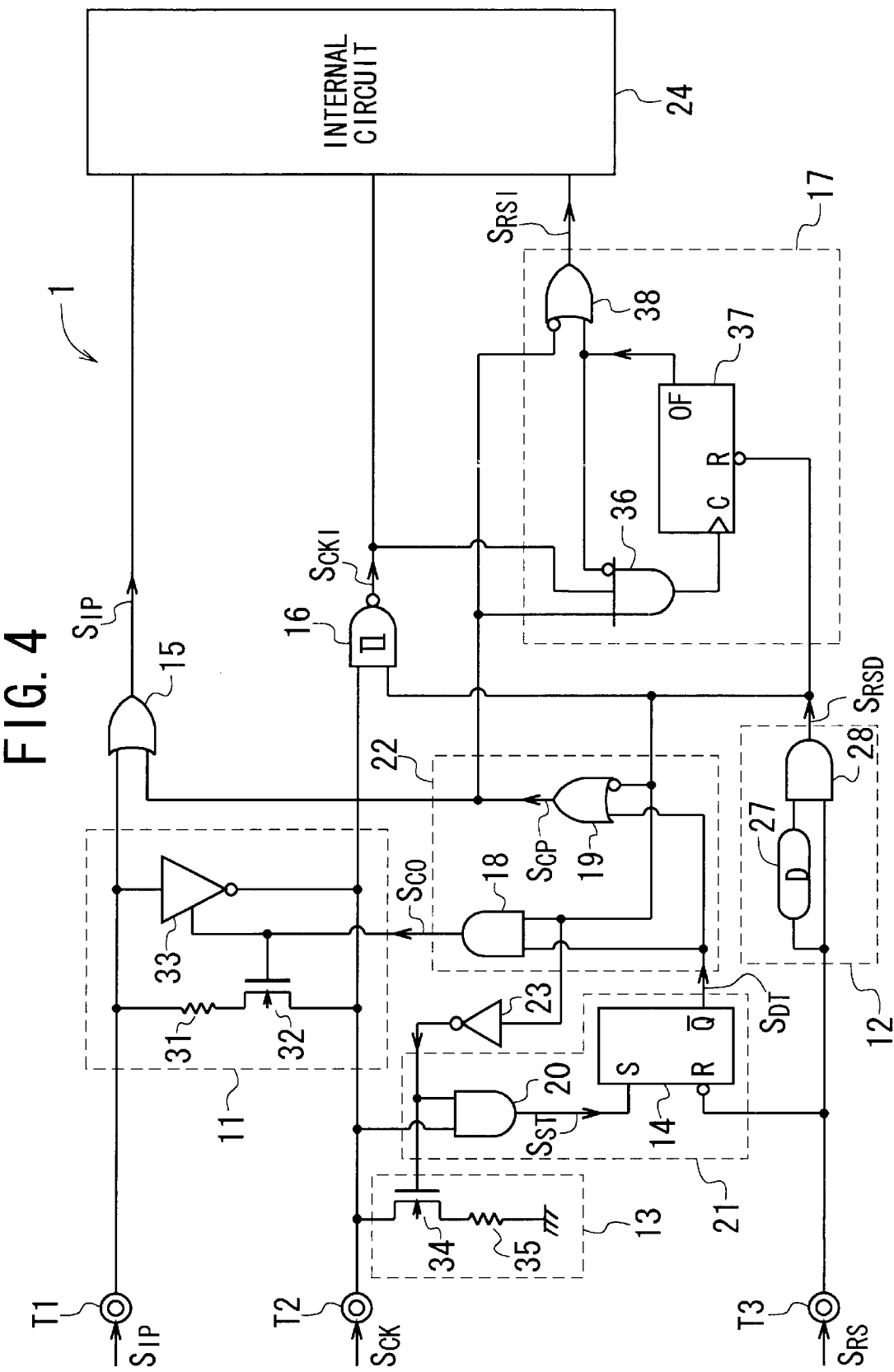
FIG. 4 is a schematic circuit diagram showing the configuration of the main part of the microcomputer according to the first embodiment of FIG. 2, where an external clock signal is inputted into the microcomputer.

FIG. 4 shows the state of the microcomputer 1 according to the first embodiment where an external clock signal $S_{CK}$ is supplied to the terminal T2. In this state, the external clock detection circuit 21 detects the external clock signal $S_{CK}$ the delay period of the delayed reset signal $S_{RSD}$ with respect to the external reset signal $S_{RS}$. Then, the circuit 21 outputs a clock detection signal $S_{DT}$ to the control signal generation circuit 22 through the inverting output terminal of the flip-flop 14.

The oscillation control signal generation circuit 22 includes an AND gate 18 and an OR gate 19. One input terminal of the AND gate 18 is connected to the output terminal of the AND gate 28 of the reset signal delay circuit 12 while the other terminal thereof is connected to the inverting output terminal of the flip-flop 14 of the external clock detection circuit 21. The AND gate 18 generates the logical product of the delayed reset signal $S_{RSD}$ and the clock detection signal $S_{DT}$, outputting it as an oscillation control circuit $S_{CO}$.

One input terminal of the OR gate 19 is connected to the output terminal of the AND gate 28 of the reset signal delay circuit 12 while the other terminal thereof is connected to the inverting output terminal of the flip-flop 14 of the external clock detection circuit 21. The OR gate 19 generates the logical product of the inverted, delayed reset signal $S_{RSD}$ and the clock signal detection signal $S_{DT}$, outputting it as an input port control circuit $S_{CP}$.

The inverting amplifier circuit 11 includes a resistor 31, an n-channel MOSFET 32, and an inverter 33 for controlling the active or inactive states or modes of the circuit 11. The drain of the MOSFET 32 is connected to the terminal T1 by way of the resistor 31 while the source of the MOSFET 32 is directly connected to the terminal T2. The gate of the MOSFET 32 is connected to the output terminal of the AND gate 18 of the control signal generation circuit 22. The oscillation control signal $S_{CO}$ is applied to the gate of the MOSFET 32. The input and output terminals of the inverter 33 are connected to the terminals T1 and T2, respectively. The control terminal of the inverter 33 is applied with the oscillation control signal $S_{CO}$.

The inverting amplifier circuit 11 is activated, in other words, it is cut into the active mode, when the oscillation control signal $S_{CO}$ is in the H level. In this state, the MOSFET 32 is turned on and the inverter 33 is in the active state. On the other hand, when the oscillation control signal $S_{CO}$ is in the L level, the MOSFET 32 is turned off and the inverter 33 is in the inactive state, resulting in the circuit 11 being in the inactive mode.

Figure 3:
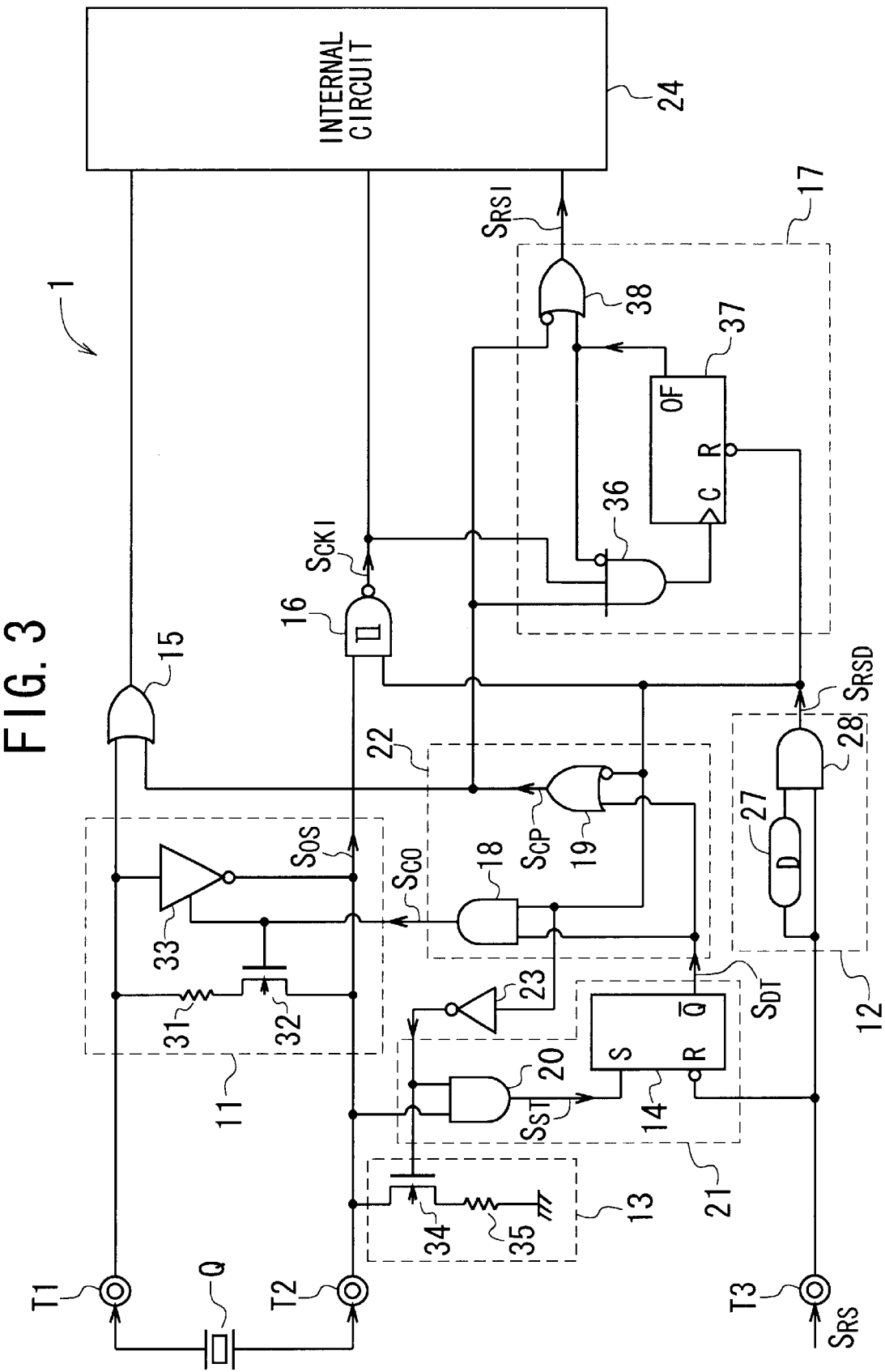
FIG. 3 is a schematic circuit diagram showing the configuration of the main part of the microcomputer according to the first embodiment of FIG. 2, where an external oscillator element is connected to the microcomputer.

FIG. 3 shows the state of the microcomputer 1 according to the first embodiment where an external oscillator element Q is connected across the terminals T1 and T2. In this state, the element Q and the inverting amplifier circuit 11 (which is in its active mode) constitute an oscillation circuit that generates an oscillation signal $S_{SO}$ according to the oscillation frequency of the element Q. The oscillation signal $S_{SO}$ thus generated is outputted from the circuit 11.

The input port control circuit 15 is formed by an OR gate. One input terminal of the circuit 15 is connected to the terminal T1 while the other input terminal thereof is connected to the output terminal of the OR gate 19 of the oscillation control signal generation circuit 22. The circuit 15 controls the pass or block of the signal at the terminal T1 according to the input port control signal $S_{CP}$. In other words, the circuit 15 serves as a gate for the signal at the terminal T1. When the external clock signal $S_{CK}$ is applied to the terminal T2, as shown in FIG. 4, the input port control circuit 15 allows the input port signal $S_{IP}$ applied to the terminal T1 to pass through the circuit 15 toward the internal circuit 24.

The clock signal output circuit 16 is formed by a NAND gate. One input terminal of the circuit 16 is connected to the output terminal of the inverter 33 of the inverting amplifier circuit 11 while the other input terminal thereof is connected to the output terminal of the AND gate 28 of the reset signal delay circuit 12. The circuit 16 controls the pass or block of the signal at the terminal T2 according to the delayed reset signal $S_{RSD}$. In other words, the clock signal output circuit 16 serves as a gate for the signal at the terminal T2.

When the oscillation element Q is connected across the terminals T1 and T2, as shown in FIG. 3, the clock output control circuit 16 allows the oscillation signal $S_{SO}$ supplied from the inverting amplifier circuit 11 to pass through the circuit 16 toward the internal circuit 24 as an internal clock signal $S_{CKI}$ in the period where the delayed reset signal $S_{RSD}$ is in the H level. Or the other hand, when the external clock signal $S_{CK}$ is applied to the terminal T2, as shown in FIG. 4, the circuit 16 allows the inverted external clock signal $S_{CK}$ to pass through the circuit 16 toward the internal circuit 24 as the internal clock signal $S_{CKI}$ in the period where the delayed reset signal $S_{RSD}$ is in the H level.

The internal reset signal generation circuit 17 includes a three-input AND gate 36, a counter 37, and an OR gate 38. The first, second, and third input terminals of the AND gate 36 are connected to the output terminal of the OR gate 19 of the control signal generation circuit 22, the output terminal of the clock output circuit 16, and the overflow terminal of the counter 37, respectively. The clock and reset terminals of the counter 37 are connected to the output terminal of the AND gate 36 and the output terminal of the AND gate 28 of the reset signal delay circuit 12, respectively. The two input terminals of the OR gate 38 are connected to the output terminal of the OR gate 19 of the control signal generation circuit 22 and the overflow terminal of the counter 37, respectively.

The circuit 17 generates the internal reset signal $S_{RSI}$ on the basis of the delayed reset signal $S_{RSD}$, the input port control signal $S_{CP}$, and the internal clock signal $S_{CKI}$. When the oscillation element Q is connected across the terminals T1 and T2, as shown in FIG. 3, the circuit 17 counts the pulse number of the internal clock signal $S_{CKI}$ with the counter 37 after the delayed reset signal $S_{RSD}$ is turned from the L level to the H level. Thereafter, the circuit 17 outputs the internal reset signal $S_{RSI}$ toward the internal circuit 24 at the time the count number reaches a specific value (i.e., the counter 37 overflows). On the other hand, when the external clock signal $S_{CK}$ is applied to the terminal T2, as shown in FIG. 4, the circuit 17 outputs the internal reset signal $S_{RSI}$ toward the internal circuit 24 at the time the input port control signal $S_{CP}$ is turned from the H level to the L level.

The internal circuit 24 includes a Central Processing Unit (CPU) memories, peripherals (all of which are not shown), and so on. The circuit 24 receives the internal clock signal $S_{CKI}$ from the clock output circuit 16 and the internal reset signal $S_{RSI}$ from the internal reset signal generation circuit 17. Moreover, when the external clock signal $S_{CK}$ is applied to the terminal T2, as shown in FIG. 4, the circuit 24 receives the input port signal $S_{IP}$ by way of the input port control circuit 15. Needless to say, the circuit 24 receives other signals by way of other input ports (not shown).

The circuit 24 is reset by the internal reset signal $S_{RSI}$ and then, it conducts the specific operations or functions according to the internal clock signal $S_{CKI}$, providing specific microcomputer functions.

Next, the operation of the microcomputer 1 according to the first embodiment is explained below with reference to the timing charts of FIGS. 5 and 6.

When the oscillation element Q is connected across the terminals T1 and T2, as shown in FIG. 3 the microcomputer 1 operates in the following way.

Figure 5:
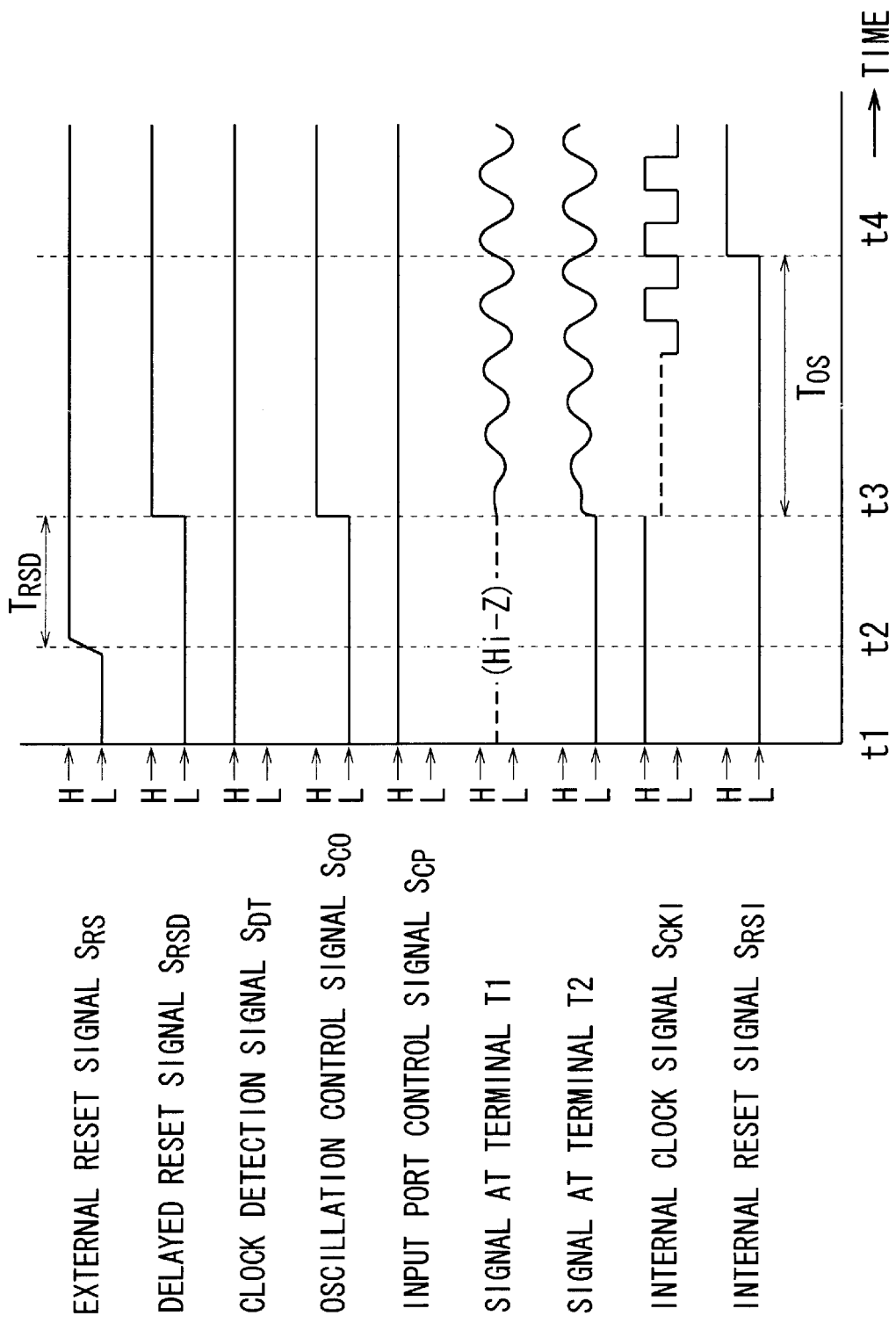
FIG. 5 is a timing diagram showing the operation of the microcomputer according to the first embodiment of FIG. 2, where an external oscillator element is connected to the microcomputer.

At the initial time t1 in FIG. 5, the external reset signal $S_{RS}$ inputted into the terminal T3 is in the L level and therefore, the flip-flop circuit 14 of the external clock detection circuit 21 is in the reset state. Thus, the clock detection signal $S_{DT}$ outputted from the external clock detection signal 21 is in the H level. Also, the delayed reset signal $S_{RSD}$ outputted from the reset circuit signal delay circuit 12 is in the L level. Accordingly, the oscillation control signal $S_{CO}$ and the input port control signal $S_{CP}$, which are outputted from the control signal generation circuit 22, are in the L level and the H level, respectively.

Since the oscillation control signal $S_{CO}$ is in the level, the inverting amplifier circuit 11 is inactivated and no oscillation circuit is constituted. Thus, the signal at the external terminal T1 is in the Hi-Z state. Also, the signal at the external terminal T2 is in the L level because the pull-down circuit 13 conducts the pull-down operation.

The input port control signal $S_{CP}$ is in the H level and thus, the signal at the terminal T1 is prevented from reaching the internal circuit 24 due to the input port control circuit 15.

The counter 37 of the internal reset signal generation circuit 17 is in the reset state due to the delayed reset signal $S_{RSD}$ in the L level. The input port control signal $S_{CP}$ in the H level is applied to the OR gate 38 of the circuit 17. Thus, the internal reset signal $S_{RSI}$ outputted from the circuit 17 is in the L level.

At the time t2 when the external reset signal $S_{RS}$ is turned from the L level to the H level, the delayed reset signal $S_{RSD}$ is kept in the L level and the pull-down operation of the pull-down circuit 13 is kept unchanged. Thus, the clock detection signal $S_{DT}$ is kept in the H level.

Also, the oscillation control signal $S_{CO}$, the input port control signal $S_{CP}$, the signals at the external terminals T1 and T2, the internal clock signal $S_{CKI}$, and the internal reset signal $S_{RSI}$ are not changed at the time t2, which are the same as those at the prior time t1.

At the time t3, which is later than the time t2 by the delay period $T_{RSD}$ of the delay element 27 of the reset delay circuit 12, the delayed reset signal $S_{RSD}$ is turned from the L level to the H level. Thus, the oscillation control signal $S_{CO}$ is turned from the L level to the H level and at the same time, the pull-down circuit 13 stops its pull-down operation.

Accordingly, the inverting amplifier circuit 11 is activated to thereby conduct its self-biasing and inverting amplification operations. The inverting-amplified signal outputted from the circuit 11 is fed back by way of the oscillation element Q. Thus, the element Q and the circuit 11 constitute an oscillator circuit, outputting the sinusoidal oscillation signal $S_{OS}$ at the terminal T2. This means that the signal at the terminal T1 is an inverted one of the oscillation signal $S_{OS}$.

Since the delayed reset signal $S_{RSD}$ applied to the clock output circuit 16 is turned from the L level to the H level at the time t3, the internal clock signal $S_{CKI}$ according to the oscillation signal $S_{OS}$ is supplied to the internal circuit 24.

Also, at the time t3, the internal reset signal generation circuit 17 starts its counting operation of the internal clock signal $S_{CKI}$ with the counter 37. In this period, the internal reset signal $S_{RSI}$ is kept in the L level.

Since the delayed reset signal $S_{RSD}$ is in the H level, the clock detection signal $S_{DT}$ is kept in the H level. Thus, the input port control signal $S_{CP}$ is kept in the H level.

At the time t4 when the count number of the internal clock signal $S_{CKI}$ by the counter 37 of the internal reset signal generation circuit 17 reaches a specific value, the internal reset signal $S_{RSI}$ is turned from the L level to the H level. At this time, the oscillation stabilization period $T_{OS}$ has passed and therefore, the oscillation signal $S_{OC}$ has been sufficiently stabilized, thereby providing the stable internal clock signal $S_{CKI}$. Thus, after the signal $S_{CKI}$ is stabilized, the internal reset signal $S_{RSI}$ is turned from the L level to the H level. Due to the internal reset signal $S_{RSI}$ in the H level, the internal circuit 24 is reset and then, it restarts its operations.

Moreover, when the external clock signal $S_{CK}$ is directly supplied to the terminal T2, as shown in FIG. 4, the microcomputer 1 operates in the following way.

Figure 6:
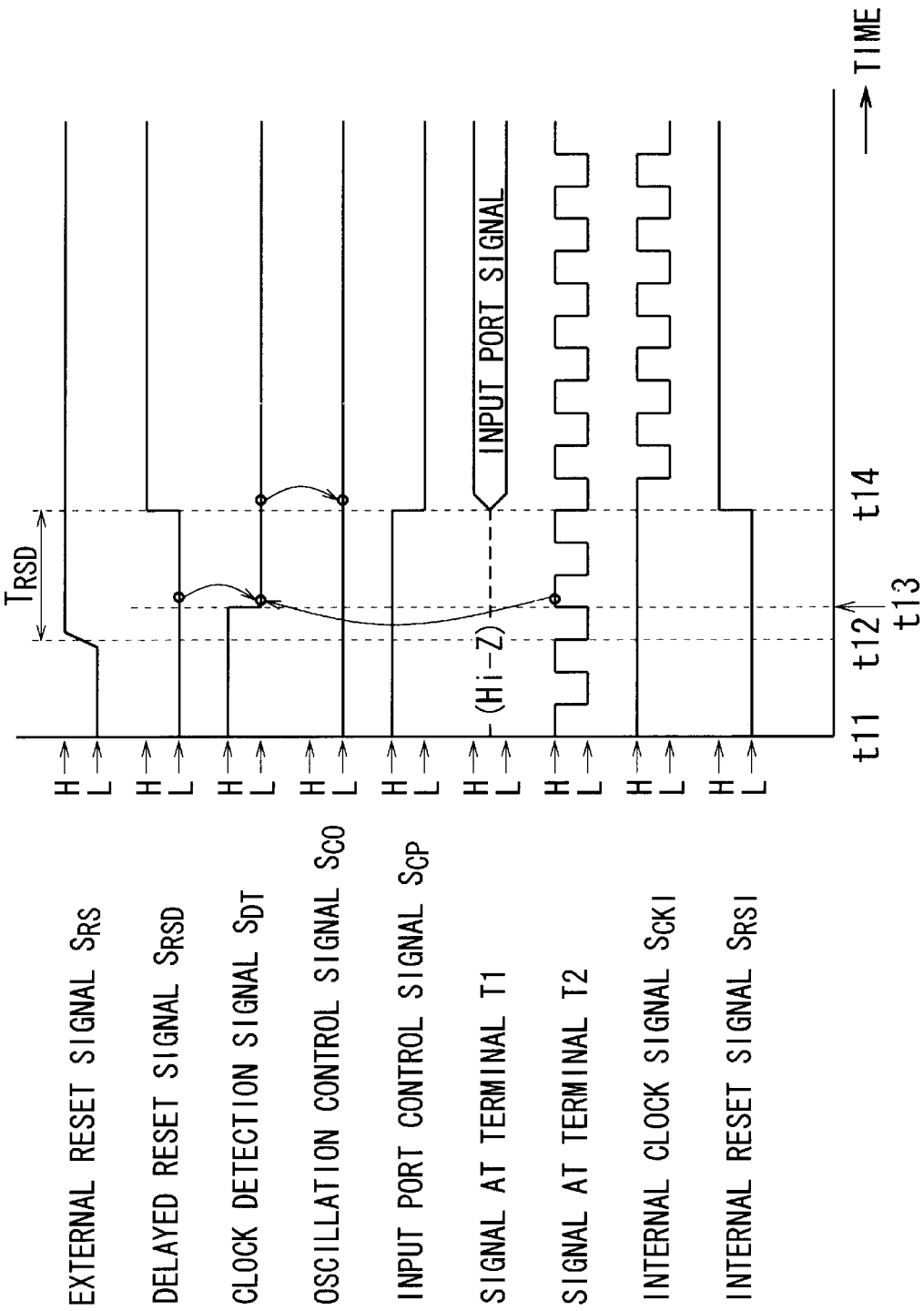
FIG. 6 is a timing diagram showing the operation of the microcomputer according to the first embodiment of FIG. 2, where an external clock signal is inputted into the microcomputer.

At the initial time t11 in FIG. 6, the external reset signal $S_{RS}$ inputted into the terminal T3 is in the L level. Thus, the flip-flop 14 of the external clock signal detection circuit 21 is in the reset state, resulting in the clock detection signal $S_{DT}$ in the H level at the output terminal of the circuit 21. Also, since the delayed reset signal $S_{RSD}$ outputted from the reset signal delay circuit 12 is in the L level, the oscillation control signal $S_{CO}$ is in the L level while the input port control signal $S_{CP}$ is in the H level.

The inverting amplifier circuit 11 is kept in the inactive state due to the oscillation control signal $S_{CO}$ in the L level and thus, no oscillation circuit is constituted, resulting in the signal at the terminal T1 being in the Hi-Z state. Also, the external clock signal $S_{CK}$ is applied to the terminal T2 which is in the pull-down state caused by the high-resistance in the pull-down circuit 13.

Since the input port control signal $S_{CP}$ is in the H level, the signal at the terminal T1 is prevented from reaching the internal circuit 24 by the input port control circuit 15.

Both the signal at the terminal T1 and the delayed reset signal $S_{RSD}$ are in the L level and therefore, the internal clock signal $S_{CKI}$ outputted from the clock output circuit 16 is kept in the H level.

The counter 37 of the internal reset signal generation circuit 17 is in the reset state due to the delayed reset signal $S_{RSD}$ while the input port control signal $S_{CP}$ applied to the OR gate 38 of the circuit 17 is in the H level. Therefore, the internal reset signal $S_{RSI}$ outputted from the circuit 17 is in the L level.

At the time t12 when the external reset signal $S_{RS}$ is turned from the L level to the H level, the delayed reset signal $S_{RSD}$ is kept in the L level and the pull-down operation of the pull-down circuit 13 is kept unchanged. Also, since the external reset signal $S_{RS}$ is in the L level, the set signal $S_{ST}$ outputted from the clock signal detection circuit 21 is kept in the L level and the clock detection signal $S_{DT}$ is kept in the H level.

Also, the oscillation control signal $S_{CO}$, the input port control signal $S_{CP}$, the signal at the external terminal T1, the internal clock signal $S_{CKI}$, and the internal reset signal $S_{RSI}$ are not changed at the time t12, which are the same as those at the prior time t11.

At the time t13, the external clock signal $S_{CK}$ applied to the terminal T2 is turned from the L level to the H level; thus, the set signal $S_{ST}$ outputted from the AND gate 20 of the clock signal detection circuit 21 is turned from the L level to the H level. At this time, since the external reset signal $S_{RS}$ applied to the reset terminal of the flip-flop 14 is in the H level, the flip-flop 14 is turned to the set state. As a result, the clock detection signal $S_{DT}$ from the circuit 21 is turned from the H level to the L level.

Thus, even if the clock detection signal $S_{DT}$ is turned from the H level to the L level, the oscillation control signal $S_{OS}$ is kept in the L level due to the delayed reset signal $S_{RSD}$ in the L level. As a result, the input port control signal $S_{CP}$ is kept in the H level.

Accordingly, the signal at the terminal T1, the internal clock signal $S_{CKI}$, and the internal reset signal $S_{RSI}$ are not changed and kept in the same state as those at the time t11.

At the time t14, which is later than the time t12 by the delay period $T_{RSD}$ of the delay element 27 of the reset delay circuit 12, the delayed reset signal $S_{RSD}$ is turned from the L level to the H level. However, the clock detection signal $S_{DT}$ is kept in the L level by the flip-flop 20 of the external clock detection circuit 21. Thus, the oscillation control signal $S_{CO}$ is kept in the L level and therefore, the inverting amplifier circuit 11 is kept in the inactive state.

On the other hand, the clock detection signal $S_{DT}$ applied to the OR gate 19 of the oscillation control signal generation circuit 22 is in the L level and therefore, the input port control signal $S_{CP}$ is turned from the H level to the L level. Thus, the signal block state of the input port control circuit 15 is released, which means that the input port signal $S_{IP}$ applied to the terminal T1 reaches the inner circuit 24 by way of the circuit 15.

Moreover, the delayed reset signal $S_{RSD}$ applied to the clock output circuit 16 is in the H level and therefore, an inverted one of the external clock signal $S_{CK}$ applied to the terminal T2 is outputted from the circuit 16 to the internal circuit 24.

Since the input port control signal $S_{CP}$ applied to the OR gate 38 of the internal reset signal generation circuit 17 is in the L level, the internal reset signal $S_{RSI}$ outputted from the circuit 17 is turned from the L level to the H level. Accordingly, due to the internal reset signal $S_{RSI}$ in the H level, the internal circuit 24 is reset and then, it restarts its specific operations.

The internal reset signal generation circuit 17 outputs the internal reset signal $S_{RSI}$ to the internal circuit 24 in a specific period after the internal circuit 24 is reset by the internal reset signal $S_{RSI}$.

With the microcomputer 1 according to the first embodiment, as explained above, the reset signal delay circuit 12 outputs the delayed reset signal $S_{RSD}$ by delaying the output timing of the external reset signal $S_{RS}$ by the specific period. The external clock detection circuit 21 detects the external clock signal $S_{CK}$ in the delay period $T_{RSD}$ and outputs the clock detection signal $S_{DT}$. The oscillation control signal generation circuit 22 generates the oscillation control signal $S_{CO}$ on the basis of the delayed rest signal $S_{RSD}$ and the clock detection signal $S_{DT}$, outputting the oscillation control signal $S_{CO}$ to the inverting amplifier circuit 11. The circuit 11 is controlled by the oscillation control signal $S_{CO}$ thus outputted, thereby putting the circuit 11 in the active or inactive state.

Therefore, when the external oscillation element Q is connected across the terminals T1 and T2, the inverting amplifier circuit 11 is activated by the oscillation control signal $S_{CO}$, generating the oscillation signal $S_{OS}$. Then, the clock output circuit 16 outputs the internal clock signal $S_{CKI}$ according to the oscillation signal $S_{OS}$ to the inner circuit 24.

On the other hand, when the external clock signal $S_{CK}$ is applied to the terminal T2, the inverting amplifier circuit 11 is inactivated by the oscillation control signal $S_{CO}$. Thus, the oscillation signal $S_{OS}$ is not generated. In this case, the clock output circuit 16 outputs the internal clock signal $S_{CKI}$ according to the external clock signal $S_{CK}$ to the inner circuit 24.

Accordingly, there is no need to input a selection signal for selecting whether the oscillation element Q is connected across the terminals T1 and T2 or the external clock signal $S_{CK}$ is directly applied to the terminal T2. This means that the terminal for receiving the selection signal is unnecessary. As a consequence, the count of programmable input/output terminals for a user is increased by one.

Furthermore, with the microcomputer 1 according to the first embodiment, the control signal generation circuit 22 outputs the input port control signal $S_{CP}$ on the basis of the delayed reset signal $S_{RSD}$ and the clock detection signal $S_{DT}$. Due to the signal $S_{CP}$ thus outputted, the input port control circuit 15 controls to let the signal at the terminal T1 pass through or block the same. Accordingly, when the external clock signal $S_{CK}$ is applied to the terminal T2, the input port signal $S_{IP}$ can be applied to the internal circuit 24. This means that the terminal T1 can be used as an input port, which increases the count of the input/output port by one.

Additionally, when the oscillation element Q is connected across the terminals T1 and T2, after the oscillation signal $S_{OC}$ is stabilized (and therefore, the internal clock signal $S_{CKI}$ is stabilized), the internal reset signal $S_{RSI}$ outputted from the internal rest signal generation circuit 17 is turned from the L level to the H level (i.e., the active level). Thus, there is an additional advantage that the microcomputer 1 operates stably.

Second Embodiment

Figure 7:
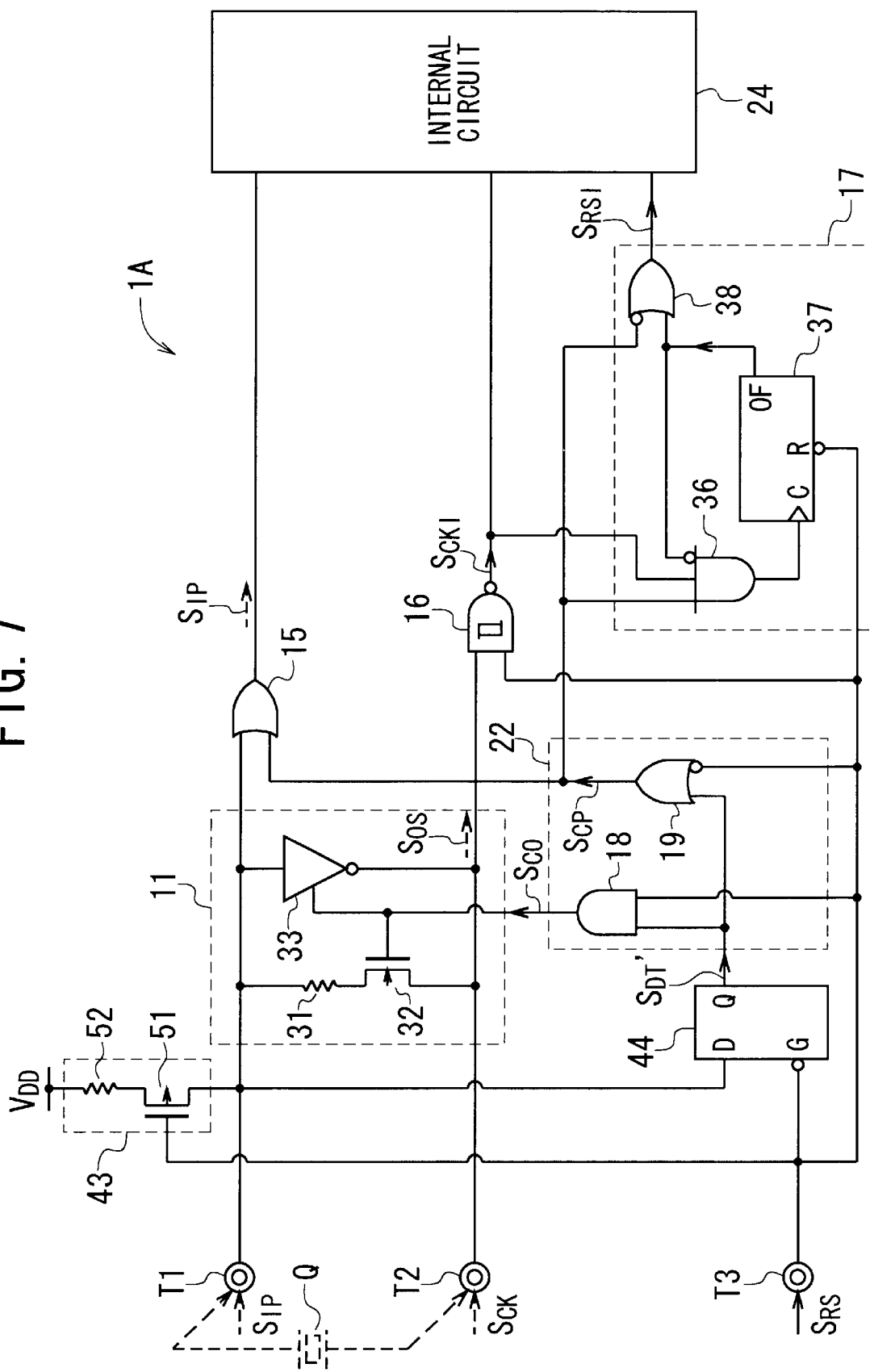
FIG. 7 is a schematic circuit diagram showing the configuration of the main part of a microcomputer according to a second embodiment of the invention.

FIG. 7 shows a microcomputer 1A according to a second embodiment of the invention, which comprises the same configuration as that of the microcomputer 1 according to the first embodiment of FIG. 2 except that the reset signal delay circuit 12 is deleted and that the external clock signal detection circuit 21 and the pull-down circuit 13 are respectively replaced with a latch circuit 44 and a pull-up circuit 43. Therefore, the explanation about the same configuration is omitted here by attaching the same reference symbols as those in the first embodiment in FIG. 7 for the sake of simplification.

The pull-up circuit 43 includes a p-channel MOSFET 51 and a resistor 52. The source of the MOSFET 51 is connected to the power supply line applied with the voltage $V_{DC}$ by way of the resistor 52. The drain of the MOSFET 51 is connected to the terminal T1. The gate of the MOSFET 51 is connected to the terminal T3 and applied with the external reset signal $S_{RS}$. The circuit 43 conducts the pull-up operation for raising the potential or level of the terminal T1 to a specific level (i.e., the inactivation level) responsive to the external reset signal $S_{RS}$.

The gate and data terminals of the latch circuit 44 are connected to the terminals T3 and T1, respectively. The circuit 44 latches or holds the signal at the terminal T1 at the time the external reset signal $S_{RS}$ is turned from the L level to the H level. Then, the circuit 44 outputs the signal thus latched to the control signal generation circuit 22 as an input port signal detection signal $S_{DT}'$.

In the control signal generation circuit 22, one input terminal of the AND gate 18 is connected to the output terminal of the latch circuit 44. The other input terminal of the AND gate 18 is connected to the terminal T3. The AND gate 18 generates the logical product of the external reset signal $S_{RS}$ and the input port signal detection signal $S_{DT}'$, outputting it as the oscillation control signal $S_{CO}$. Also, one input terminal of the OR gate 19 is connected to the output terminal of the latch circuit 44. The other input terminal of the OR gate 19 is connected to the terminal T3. The OR gate 19 generates the logical sum of the inverted, external reset signal $S_{RS}$ and the input port signal detection signal $S_{DT}'$, outputting it as the input port control signal $S_{CI}$.

The two input terminals of the clock output circuit 16 are connected to the terminals T2 and T3, respectively. The circuit 16 controls the output or block of the signal at the terminal T2 to the inner circuit 24 on the basis of the external reset signal $S_{RS}$.

In the internal reset signal generation circuit 17, the reset terminal of the counter 37 is connected to the terminal T3. The circuit 17 generates the input reset signal $S_{RSI}$ on the basis of the external reset signal $S_{RS}$, the input port control signal $S_{CP}$, and the input clock signal $S_{CKI}$, outputting the signal $S_{RSI}$ to the internal circuit 24.

Next, the operation of the microcomputer 1A according to the second embodiment of FIG. 7 is explained below with reference to the timing charts of FIGS. 8 and 9.

When the oscillation element Q is connected across the terminals T1 and T2, the microcomputer 1A operates in the following way.

Figure 8:
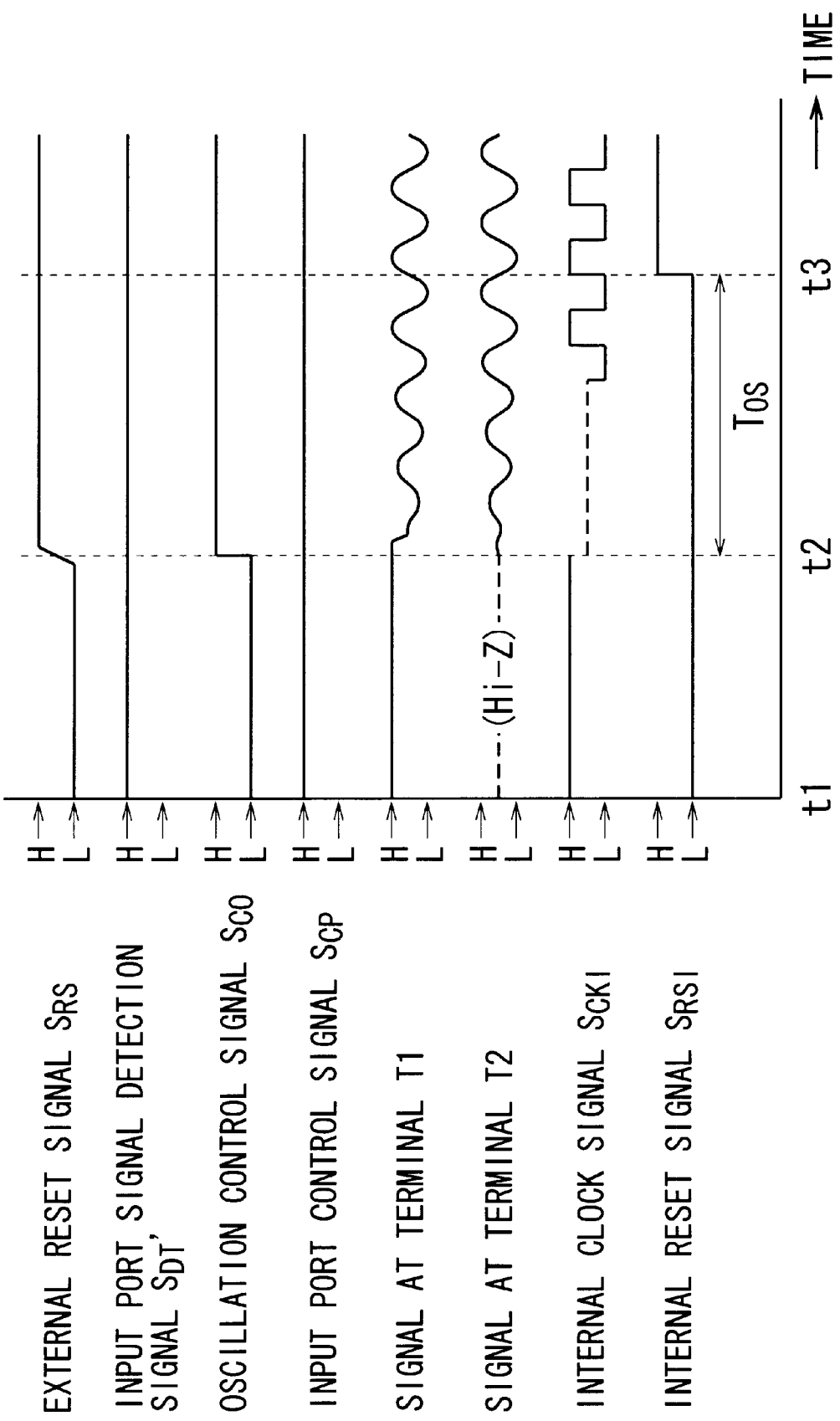
FIG. 8 is a timing diagram showing the operation of the microcomputer according to the second embodiment of FIG. 7, where an external oscillator element is connected to the microcomputer.

At the initial time t1 in FIG. 8, the external reset signal $S_{RS}$ applied to the terminal T3 is in the L level. Due to this signal $S_{RS}$, the pull-up circuit 43 conducts its pull-up operation, causing the signal at the terminal T1 to be the H level. Since the latch circuit 44 latches the H-level signal at the terminal T1, the input port signal detection signal $S_{DT}'$ is in the H level. At this time, the external reset signal $S_{RS}$ applied to the AND gate 18 of the control signal generation circuit 22 is in the L level and thus, the oscillation control signal $S_{CO}$ outputted from the AND gate 18 is in the L level. Due to the signal $S_{CO}$ in the L level, the inverting amplifier circuit 11 is inactivated which means that no oscillation circuit is constituted and that the signal at the terminal T2 is in the Hi-Z state.

Since the external reset signal $S_{RS}$ applied to the OR gate 19 of the control signal generation circuit 22 is in the L level, the input port control signal $S_{CP}$ outputted from the circuit 22 and inputted into the input port control circuit 15 is in the H level. Thus, the signal at the terminal T1 is prevented from reaching the internal circuit 24 by the circuit 15.

Since the external reset signal $S_{RS}$ if the L level is applied to the clock output circuit 16, the internal clock signal $S_{CKI}$ is in the H level.

The counter 37 of the internal reset signal generation circuit 17 is in the reset state due to the external reset signal $S_{RS}$ in the L level. The input port control signal $S_{CP}$ applied to the OR gate 38 of the circuit 17 is in the H level. Thus, the internal reset signal $S_{RSI}$ is in the L level.

At the time t2 when the external reset signal $S_{RS}$ is turned from the L level to the H level, the input port signal detection signal $S_{DT}'$ is kept in the H level, because the latched state by the latch circuit 44 is kept unchanged.

Both the input port signal detection signal SDT' and the external reset signal $S_{RS}$, which are applied to the AND gate 18 of the control signal generation circuit 22, are in the H level. Therefore, the oscillation control signal $S_{CO}$ outputted from the AND gate 18 is turned from the L level to the H level. Due to the change of the external reset signal $S_{RS}$ from the L level to the H level, the pull-up operation of the pull-up circuit 43 is stooped.

Accordingly, the inverting amplifier circuit 11 is activated, thereby conducting the self-biasing and inverting amplification operations for the signal applied to the circuit 11. The amplified signal is fed back to the circuit 11 by way of the external oscillation element Q. Thus, the element Q and the circuit 11 constitute an oscillation circuit for outputting the oscillation signal $S_{OS}$ with the sinusoidal wave.

The external reset signal $S_{RS}$ in the H level is applied to the clock output circuit 16. Thus, the circuit 16 outputs the internal clock signal $S_{CKI}$ according to the sinusoidal oscillation signal $S_{OS}$ to the internal circuit 24.

Also, at the time t2, the internal reset signal generation circuit 17 starts its counting operation about the internal clock signal $S_{CKI}$ with the counter 37. The internal reset signal $S_{RSI}$ is kept in the L level.

At the time t3 when the count number of the internal clock signal $S_{CKI}$ by the counter 37 of the internal reset signal generation circuit 17 reaches a specific value, the internal reset signal $S_{RSI}$ is turned from the L level to the H level. At this time, the oscillation stabilization period $T_{OS}$ has passed and therefore, the oscillation signal $S_{OC}$ has been sufficiently stabilized, thereby providing the stable internal clock signal $S_{CKI}$. Thus, after the signal $S_{CKI}$ is stabilized, the internal reset signal $S_{RSI}$ is turned from the L level to the H level. Due to the internal reset signal $S_{RSI}$ in the H level, the internal circuit 24 is reset and then, it restarts its operations.

Moreover, when the external clock signal $S_{CK}$ is directly supplied to the terminal T2, the microcomputer 1A operates in the following way.

Figure 9:
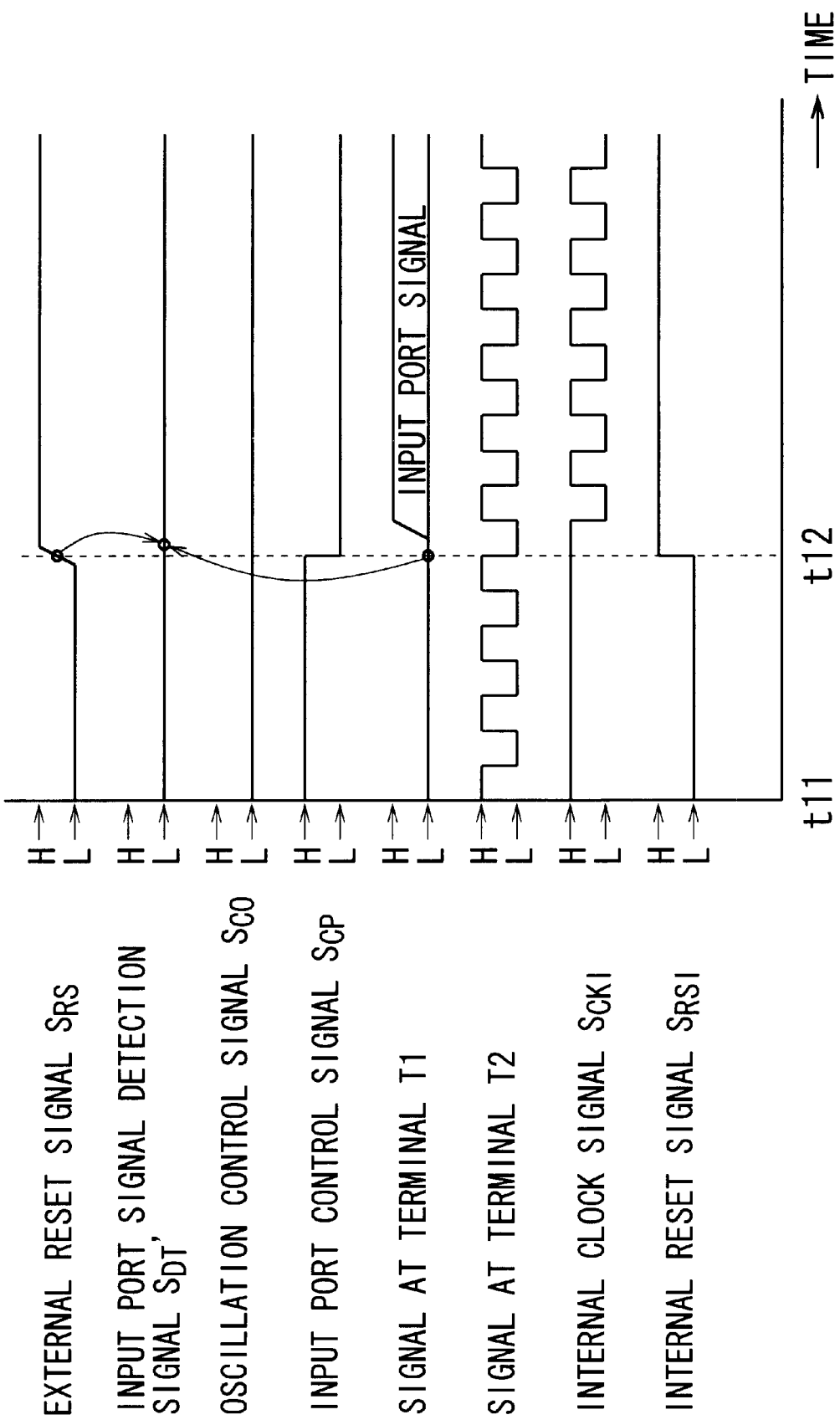
FIG. 9 is a timing diagram showing the operation of the microcomputer according to the second embodiment of FIG. 7, where an external clock signal is inputted into the microcomputer.

At the initial time t11 in FIG. 9, the external reset signal $S_{RS}$ inputted into the terminal T3 is in the L level. The input port signal $S_{IP}$ applied to the terminal T1 is in the L level.

The pull-up circuit 43 conducts its pull-up operation according to the external reset signal $S_{RS}$ in the L level while the signal at the terminal T1 is in the L level due to the input port signal $S_{IP}$.

The latch circuit 44 latches the L-level signal at the terminal T1 and thus, the input port signal detection signal $S_{DT}'$ is in the L level.

Since the AND gate 18 of the oscillation control signal generation circuit 22 receives the external reset signal $S_{RS}$ in the L level, the oscillation control signal $S_{CO}$ outputted from the circuit 22 is in the L level. Thus, the inverting amplifier circuit 11 is inactivated and no oscillation circuit is constituted and as a result, the external reset signal $S_{RS}$ is applied to the clock output circuit 16.

Since the OR gate 13 of the circuit 22 receives the external reset signal $S_{RS}$ in the L level, the input port control signal $S_{CP}$ outputted from the circuit 22 is in the H level. Therefore, the input port control circuit 15 blocks the output of the signal at the terminal T1, in other words, the circuit 15 prevents the signal at the terminal T1 from reaching the internal circuit 24.

The clock output circuit 16 receives the external reset signal $S_{RS}$ in the L level and thus, the internal clock signal $S_{CKI}$ outputted from the circuit 16 is in the H level.

The counter 37 of the internal reset signal generation circuit 17 is in the reset state due to the external reset signal $S_{RS}$. The OR gate 38 of the circuit 17 receives the input port control signal $S_{CP}$ in the H level. Thus, the internal reset signal $S_{RSI}$ outputted from the circuit 17 is in the L level.

At the time t12 when the external reset signal $S_{RS}$ is turned from the L level to the H level, the input port signal detection signal $S_{DT}'$ is kept in the L level, because the latched state of the latch circuit 44 is kept unchanged.

The AND gate 18 of the control signal generation circuit 22 receives the input port signal detection signal $S_{DT}'$ in the L level. Thus, the oscillation control signal $S_{CO}$ outputted from the gate 18 is kept in the L level. Also, because the external reset signal $S_{RS}$ is turned from the L level to the H level, the pull-up operation of the pull-up circuit 43 is stopped.

As a result, the inverting amplifier circuit 11 is kept in the inactive state and the signal at the terminal T2 is the external clock signal $S_{CK}$.

On the other hand, the OR gate 19 of the control signal generation circuit 22 receives the input port signal detection signal $S_{DT}'$ in the L level. Thus, the input port control signal $S_{CP}$ is turned from the H level to the L level. As a result, the blocking state of the input port control circuit 15 is released and therefore, the input port signal $S_{IP}$ applied to the terminal T1 is sent to the inner circuit 24.

Since the clock output circuit 16 receives the external clock signal $S_{CK}$ in the H level, it outputs an inverted one of the signal $S_{CK}$ at the terminal T2 to the internal circuit 24.

The OR gate 38 of the internal reset signal generation circuit 17 receives the input port control signal $S_{CP}$ in the L level. Thus, the input port control signal $S_{CP}$ is turned from the L level to the H level.

Also, the internal reset signal $S_{RSI}$ from the circuit 17 is in she H level and thus, the inner circuit 24 is reset and restarts its operations.

With the microcomputer 1A according to the second embodiment, as explained above, the latch circuit 44 detects the input port signal $S_{IP}$ and outputs the input port signal detection signal $S_{DT}'$ in the period that the external reset signal $S_{RS}$ is in the L level. The control signal generation circuit 22 generates the oscillation control signal $S_{CO}$ according to the delayed reset signal $S_{RSD}$ and the input port detection signal $S_{DT}'$ and outputs the signal $S_{CO}$ thus generated. Due to the oscillation control signal $S_{CO}$ thus outputted, the inverting amplifier circuit 11 is controlled to be in the active or inactive state.

In other words, when the external oscillation element Q is connected across the terminals T1 and T2, the inverting amplifier circuit 11 is activated by the oscillation control signal $S_{CO}$, generating the oscillation signal $S_{OS}$. Then, the clock output circuit 16 outputs the internal clock signal $S_{CKI}$ according to the oscillation signal $S_{CO}$ to the inner circuit 24.

On the other hand, when the input port signal $S_{IP}$ and the external clock signal $S_{CK}$ are respectively applied to the terminals T1 and T2, the inverting amplifier circuit 11 is inactivated by the oscillation control signal $S_{CO}$. Thus, the oscillation signal $S_{OS}$ is not generated. In this case, the clock output circuit 16 outputs the internal clock signal $S_{CKI}$ according to the external clock signal $S_{CK}$ to the inner circuit 24.

Accordingly, there is no need to input a selection signal for selecting whether the oscillation element Q is connected or the external clock signal $S_{CK}$ is directly applied to the terminal T2. This means that the terminal for receiving the selection signal is unnecessary. As a consequence, the count of programmable input/output terminals for a user is increased by one.

Furthermore, with the microcomputer 1A according to the second embodiment, the control signal generation circuit 22 outputs the input port control signal $S_{CI}$ on the basis of the external reset signal $S_{RS}$ and the input port signal detection signal $S_{DT}$'. Due to the signal $S_{CI}$ thus outputted, the input port control circuit 15 controls to let the signal at the terminal T1 pass through or block the same. Accordingly, when the external clock signal $S_{CK}$ is applied to the terminal T2, the input port signal $S_{IP}$ can be applied to the internal circuit 24 through the terminal T1. This means that the terminal T1 can be used as an input port, which increases the count of the input/output port by one.

Additionally, with the microcomputer 1A according to the second embodiment, the internal reset signal generation circuit 17 generates the internal reset signal $S_{RSI}$ on the basis of the external reset signal $S_{RS}$, the input sort control signal $S_{CP}$, and the internal clock signal $S_{CKI}$. In other words, when the oscillation element Q is connected across the terminals T1 and T2, after the oscillation signal $S_{OC}$ is stabilized (and therefore, the internal clock signal $S_{CKI}$ is stabilized), the internal reset signal $S_{RSI}$, outputted from the circuit 17 is turned to the H level (i.e., the active state). Thus, there is an additional advantage that the microcomputer 1A operates stably.

Third Embodiment

Figure 10:
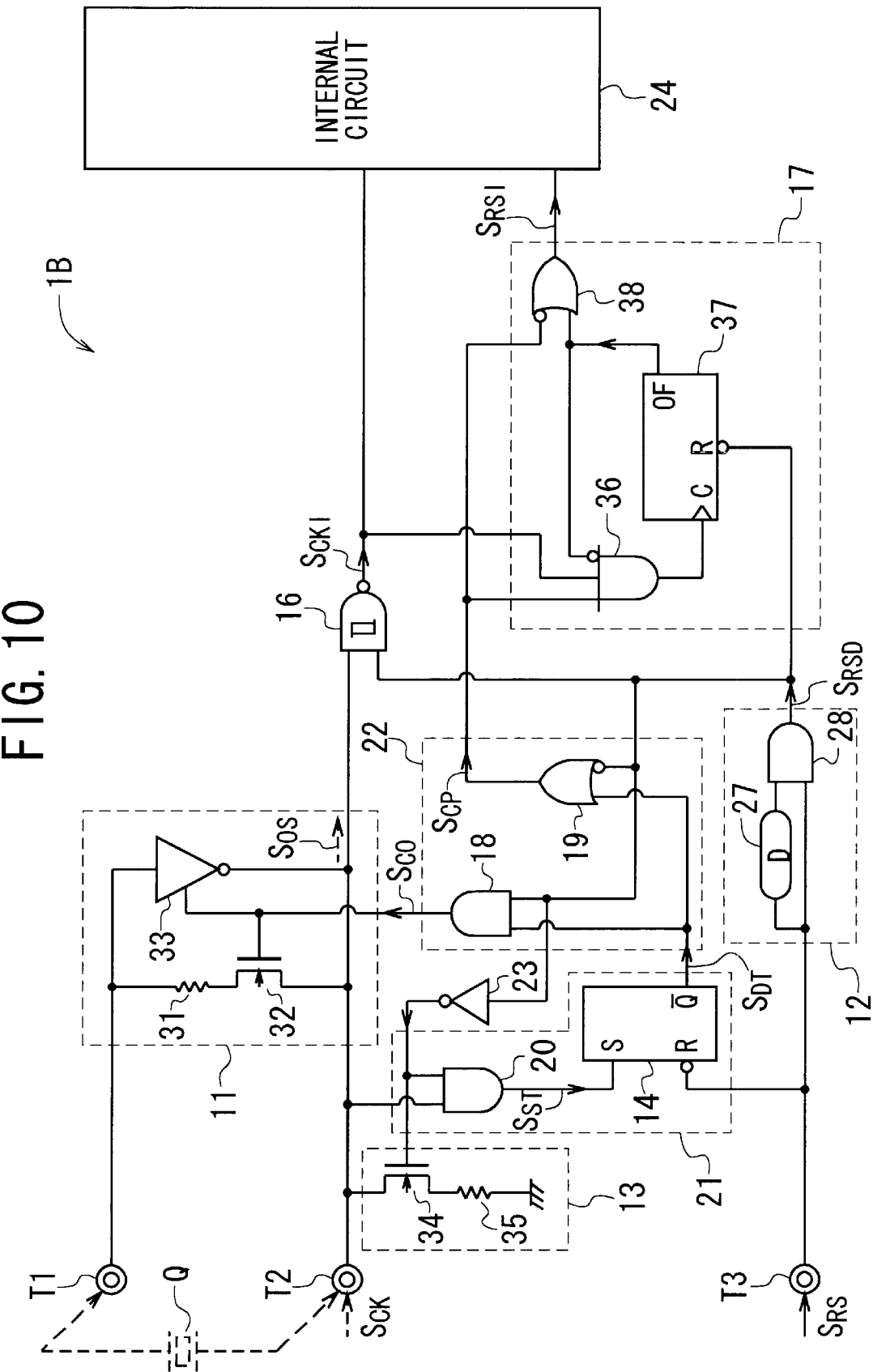
FIG. 10 is a schematic circuit diagram showing the configuration of the main part; of a microcomputer according to a third embodiment of the invention.

FIG. 10 shows a microcomputer 1B according to a third embodiment of the invention, which comprises the same configuration as that of the microcomputer 1 according to the first embodiment of FIG. 2 except that the input port control circuit 15 is deleted. Therefore, the explanation about the same configuration is omitted here by attaching the same reference symbols as those in the first embodiment in FIG. 10 for the sake of simplification.

With the microcomputer 1B according to the third embodiment, like the microcomputer 1 according to the first embodiment, there is no need to input a selection signal fox selecting whether the oscillation element Q is connected across the terminals T1 and T2 or the external clock spinal $S_{CK}$ is directly applied to the terminal T2. This means that the terminal for receiving the selection signal is unnecessary. As a consequence, although the terminal T1 is unable to be used as an input port, the count of programmable input/output terminals for a user is increased compared with the conventional microcomputer having the oscillation circuit of FIG. 1.

Variations

It is needless to say that the invention is not limited to the above-described first to third embodiments and that any variation may be applied thereto. For example, the pull-down circuit 13 is used to lower the potential at the terminal T2 in the first and third embodiments; however, any pull-up circuit may be used to pull-up the potential of the terminal T1. In this case, the same advantages as those in the first or third embodiment are given.

Also, the pull-up circuit 43 is used to raise the potential at the terminal T1 in the second embodiment. However, any pull-down circuit may be used to lower the potential of the terminal T2. In this case, the same advantages as those in the second embodiment are given.

While the preferred forms of the present invention have been described, it is to be understood that modifications will be apparent to those skill-ed in the art without departing from the spirit of the invention. The scope of the present invention, therefore, is to be determined solely by the following claims.

What is claimed is:

1. A microcomputer comprising:
   (a) a first terminal and a second terminal which are connectable to an external oscillation element;
   the second terminal being able to receive an external clock signal when the external oscillation element is not connected;
   (b) a third terminal for receiving an external reset signal;
   (c) an amplifier circuit for constituting an oscillation circuit along with an external oscillation element when the external oscillation element is connected across the first terminal and the second terminal;
   the oscillation circuit being used for generating an oscillation signal;
   (d) an internal clock signal output circuit for outputting an internal clock signal corresponding to the oscillation signal generated by the oscillation circuit or the external clock signal;
   the internal clock signal being used for operating an internal circuit of the microcomputer;
   (e) an internal reset signal generation circuit for generating an internal reset signal corresponding to the external reset signal;
   the internal reset signal being used for resetting the inner circuit for initialization;
   (f) a delay circuit for generating a delayed reset signal from the external reset signal;
   the delayed reset signal having a specific delay period with respect to the external reset signal;
   (g) an external clock signal detection circuit for detecting the external clock signal at the second terminal;
   the external clock signal detection circuit outputting a detection signal; and
   (h) an oscillation control signal generation circuit for generating an oscillation control signal for the amplifier circuit;
   the oscillation control signal being generated corresponding to the detection signal outputted from the external clock signal detection circuit;
   the oscillation control signal being used to activate the amplifier when the external clock signal does not exist at the second terminal and to inactivate the amplifier when the external clock signal exists at the second terminal.

2. The microcomputer according to claim 1, further comprising an input port control circuit;
   wherein the input port control circuit controls supply or block of the signal at the first terminal to the internal circuit according to an input port control signal;
   and wherein the input port control signal is generated in the oscillation control signal generation circuit.

3. The microcomputer according to claim 2, wherein the oscillation control signal generation circuit includes an AND gate and an OR gate;
   and wherein the AND gate receives the delayed reset signal and the detection signal, outputting the oscillation control signal while the OR gate receives the inverted, delayed reset signal and the detection signal, outputting the input port control signal.

4. The microcomputer according to claim 1, wherein the internal reset signal generation circuit outputs the internal reset signal in a period until the oscillation signal generated by the oscillation circuit is stabilized.

5. The microcomputer according to claim 1, wherein the internal reset signal generation circuit outputs the internal reset signal to the internal circuit in a specific period after the internal circuit is reset by the internal reset signal.

6. The microcomputer according to claim 1, further comprising a pull-down or pull-up circuit to lower or raise a level of the second terminal according to the delayed reset signal.

7. A microcomputer comprising:
   a) a first terminal and a second terminal which are connectable to an external oscillation element;
      the second terminal being able to receive an external clock signal when the external oscillation element is not connected;
   (b) a third terminal for receiving an external reset signal;
   (c) an amplifier circuit for constituting an oscillation circuit along with an external oscillation element when the external oscillation element is connected across the first terminal and the second terminal;
      the oscillation circuit being used for generating an oscillation signal;
   (d) an internal clock signal output circuit for outputting an internal clock signal corresponding to the oscillation signal generated by the oscillation circuit or the external clock signal;
      the internal clock signal being used for operating an internal circuit of the microcomputer;
   (e) an internal reset signal generation circuit for generating an internal reset signal corresponding to the external reset signal;
      the internal reset signal being used for resetting the inner circuit for initialization;
   (f) a latch circuit for latching a signal at the first terminal and for outputting a detection signal according to the signal thus latched; and
   (g) an oscillation control signal generation circuit for generating an oscillation control signal for the amplifier circuit;
      the oscillation control signal being generated corresponding to the detection signal outputted from the latch circuit;
      the oscillation control signal being used to activate the amplifier when the external clock signal does not exist at the second terminal and to inactivate the amplifier when the external clock signal exists at the second terminal.

8. The microcomputer according to claim 7, further comprising an input port control circuit;
   wherein the input port control circuit controls supply or block of the signal at the first terminal to the internal circuit according to an input port control signal;
   and wherein the input port control signal is generated in the oscillation control signal generation circuit.

9. The microcomputer according to claim 8, wherein the oscillation control signal generation circuit includes an AND gate and an OR gate;
   and wherein the AND gate receives the external reset signal and the detection signal, outputting the oscillation control signal;
   and wherein the OR gate receives the external reset signal and the detection signal, outputting the input port control signal.

10. The microcomputer according to claim 7, wherein the internal reset signal generation circuit outputs the internal reset signal in a period until the oscillation signal generated by the oscillation circuit is stabilized.

11. The microcomputer according to claim 7, wherein the internal reset signal generation circuit outputs the internal reset signal to the internal circuit in a specific period after the internal circuit is reset by the internal reset signal.

12. The microcomputer according to claim 7, further comprising a pull-down or pull-up circuit to lower or raise a level of the first terminal according to the external reset signal.

* * * * *